United States Patent
Ota et al.

(10) Patent No.: US 10,557,032 B2
(45) Date of Patent: Feb. 11, 2020

(54) COMPOSITION FOR SUPPORT MATERIAL AND INK SET FOR STEREOLITHOGRAPHY

(71) Applicant: MAXELL HOLDINGS, LTD., Otokuni-gen, Kyoto (JP)

(72) Inventors: Hiroshi Ota, Kyoto (JP); Keisuke Okushiro, Kyoto (JP)

(73) Assignee: MAXELL HOLDINGS, LTD., Kyoto (JP)

( * ) Notice: Subject to any disclaimer, the term of this patent is extended or adjusted under 35 U.S.C. 154(b) by 0 days.

(21) Appl. No.: 16/332,542

(22) PCT Filed: Nov. 29, 2017

(86) PCT No.: PCT/JP2017/042848
§ 371 (c)(1),
(2) Date: Mar. 12, 2019

(87) PCT Pub. No.: WO2018/101343
PCT Pub. Date: Jun. 7, 2018

(65) Prior Publication Data
US 2019/0233634 A1   Aug. 1, 2019

(30) Foreign Application Priority Data
Nov. 29, 2016  (JP) .................. 2016-231142

(51) Int. Cl.
| C08F 2/46 | (2006.01) |
| C08F 2/50 | (2006.01) |
| C08G 61/04 | (2006.01) |
| C08L 33/26 | (2006.01) |
| C08F 20/58 | (2006.01) |
| B33Y 70/00 | (2015.01) |
| C09D 11/101 | (2014.01) |
| C09D 11/30 | (2014.01) |

(52) U.S. Cl.
CPC ............ C08L 33/26 (2013.01); B33Y 70/00 (2014.12); C08F 20/58 (2013.01); C09D 11/101 (2013.01); C09D 11/30 (2013.01)

(58) Field of Classification Search
CPC ....... C08L 33/26; C09D 11/30; C09D 11/101; B29C 64/40; B29C 64/11; B29C 67/00; B33Y 70/00; C08F 20/58; C08F 2/44
USPC .............. 522/64, 6, 1, 71, 189, 184; 520/1
See application file for complete search history.

(56) References Cited

U.S. PATENT DOCUMENTS

| 9,631,129 B2 * | 4/2017 | Thomas .................. C09K 5/045 |
| 2013/0234370 A1 | 9/2013 | Suzuki et al. |
| 2014/0011934 A1 * | 1/2014 | Bouzid ................... C09D 4/06 |
| | | 524/425 |
| 2014/0162033 A1 | 6/2014 | Giller |
| 2016/0096324 A1 | 4/2016 | Giller |
| 2016/0263826 A1 | 9/2016 | Suzuki et al. |
| 2016/0264796 A1 | 9/2016 | Suzuki et al. |
| 2017/0283596 A1 | 10/2017 | Saito et al. |
| 2018/0264716 A1 | 9/2018 | Kiyosada |
| 2018/0291219 A1 | 10/2018 | Kiyosada |

FOREIGN PATENT DOCUMENTS

| JP | 2012-111226 A | 6/2012 |
| JP | 2013-540629 A | 11/2013 |
| JP | 2016-196104 A | 11/2016 |
| JP | 2017-186528 A | 10/2017 |
| JP | 2018-58974 A | 4/2018 |
| WO | WO 2012/058278 A2 | 5/2012 |
| WO | WO 2013/172406 A1 | 11/2013 |
| WO | WO 2016/121587 A1 | 8/2016 |
| WO | WO 2016-125816 A1 | 8/2016 |

OTHER PUBLICATIONS

International Search Report, issued in PCT/JP2017/042848, PCT/ISA/210, dated Feb. 13, 2018.
Office Action issued in Japanese Patent Application No. 2016-231142 dated Apr. 24, 2018.
Office Action issued in Japanese Patent Application No. 2016-231142 dated Aug. 24, 2017.

* cited by examiner

*Primary Examiner* — Jessica Whiteley
(74) *Attorney, Agent, or Firm* — Birch, Stewart, Kolasch & Birch, LLP

(57) ABSTRACT

A composition for a support material according to the present invention is to be used in a support material for supporting a model material used to form a shaped article through ink-jet stereolithography and contains polyalkylene glycol having an oxybutylene group, a water-soluble monofunctional ethylenic unsaturated monomer, and a photopolymerization initiator, and the content of the polyalkylene glycol having an oxybutylene group is 15 parts by mass or more and 75 parts by mass or less with respect to the total mass of the composition for a support material taken as 100 parts by mass.

9 Claims, No Drawings

COMPOSITION FOR SUPPORT MATERIAL AND INK SET FOR STEREOLITHOGRAPHY

TECHNICAL FIELD

The present invention relates to a composition for a support material that is to be used in a support material for supporting a shaped article in ink-jet stereolithography.

BACKGROUND ART

In recent years, a plurality of methods in which a 3D printer is used to produce a shaped article have been proposed. In particular, ink-jet stereolithography using an ink-jet technology, which is realized by a 3D printer, is known. Ink-jet stereolithography is a method in which curable ink ejected from an ink-jet head is cured through irradiation with light such as ultraviolet rays or the like and layered, and a shaped article is thereby produced. The ink-jet stereolithography is suitable for producing a shaped article that is required to be accurately formed because layers are formed by ejecting minute droplets of curable ink, and thus a highly accurate shaped article with smooth surface can be obtained.

In ink-jet stereolithography, the formation of a three-dimensional shaped article starts from the bottom surface portion, and therefore, ink for a model material for forming a shaped article and ink for a support material for supporting the shape of a shaped article during its production are used as the curable ink in order to produce a three-dimensional article having a shape that is difficult to shape as it is, such as an eave shape. A support material (support material cured article) that is a cured article of this ink for a support material is ultimately removed, and the final shaped article made of the ink for a model material is thus obtained. An example of a method for removing the support material is a method in which the support material is dissolved in water and then removed. For example, Patent Document 1 proposes a support material containing a water-soluble monofunctional ethylenic unsaturated monomer, an alkylene oxide adduct having an oxypropylene group, and a photopolymerization initiator.

When the amount of the alkylene oxide adduct having an oxypropylene group, which has excellent water solubility, contained in the support material described in Patent Document 1 is greater than or equal to a certain amount, water solubility can be imparted to a polymer of the water-soluble monofunctional ethylenic unsaturated monomer polymerized through irradiation with ultraviolet rays, thus making it possible to remove the support material with water.

PRIOR ART DOCUMENTS

Patent Documents

Patent Document 1: JP 2012-111226A

DISCLOSURE OF INVENTION

Problem to be Solved by the Invention

The alkylene oxide adduct having an oxypropylene group, such as polypropylene glycol, contained in the support material described in Patent Document 1 is highly hydrophilic, and therefore, the higher the content thereof in the support material is, the more easily the support material can be removed with water. On the other hand, the higher the content of the alkylene oxide adduct having an oxypropylene group, such as polypropylene glycol, in the support material is, the larger amount of moisture in air the support material containing polypropylene glycol (alkylene oxide adduct having an oxypropylene group) takes in, which poses a problem in that the self-standing properties are impaired, and the supportability of the support material is thus impaired. Here, the term "hydrophilicity" means a characteristic that a substance has a high affinity for water, and easily dissolves or disperses in water.

The present invention provides a composition for a support material with which a support material having both excellent water removal properties and excellent supportability is realized.

Means for Solving Problem

A composition for a support material of the present invention is to be used in a support material for supporting a model material used to form a shaped article through ink-jet stereolithography and contains polyalkylene glycol having an oxybutylene group, wherein the content of the polyalkylene glycol having an oxybutylene group is 15 parts by mass or more and 75 parts by mass or less with respect to a total mass of the composition for a support material taken as 100 parts by mass.

Effects of the Invention

With the present invention, it is possible to provide a composition for a support material with which a support material having both excellent water removal properties and excellent supportability is realized.

DESCRIPTION OF THE INVENTION

Hereinafter, an embodiment of the composition for a support material of the present invention will be described.

The composition for a support material of this embodiment is to be used in a support material for supporting a model material used to form a shaped article through ink-jet stereolithography and contains polyalkylene glycol having an oxybutylene group, and the content of the polyalkylene glycol having an oxybutylene group is 15 parts by mass or more and 75 parts by mass or less with respect to the total mass of the composition for a support material taken as 100 parts by mass. The composition for a support material of this embodiment is used as a support material for supporting a model material used to form a three-dimensional shaped article, during the production of the three-dimensional shaped article.

The composition for a support material of this embodiment contains the polyalkylene glycol having an oxybutylene group at the above-mentioned content, thus making it possible to provide a support material having both excellent water removal properties and excellent supportability. In addition, the composition for a support material of this embodiment contains the polyalkylene glycol having an oxybutylene group at the above-mentioned content, thus making it possible to provide a support material having excellent low-temperature stability. The polyalkylene glycol having an oxybutylene group is water-soluble, but has hydrophilicity to an extent that the supportability of a formed support material is not impaired. However, since the polyalkylene glycol having an oxybutylene group is water-soluble, a formed support material has excellent water removal properties. Here, the term "water solubility" means a characteristic that a substance can easily dissolve or disperse in water. The above-mentioned composition for a support material does not solidify (harden) and lose its fluidity at low temperatures, and it has excellent low-temperature stability.

More specifically, the composition for a support material of this embodiment contains the above-mentioned polyalkylene glycol having an oxybutylene group, a water-soluble monofunctional ethylenic unsaturated monomer, and a photopolymerization initiator. This makes it possible to realize a support material having both excellent water removal properties and excellent supportability and to provide a composition for a support material having excellent low-temperature stability.

As described above, the content of the polyalkylene glycol having an oxybutylene group is 15 parts by mass or more and 75 parts by mass or less with respect to the total mass of the composition for a support material taken as 100 parts by mass. If the content is smaller than 15 parts by mass, the hydrophilicity of the support material will be impaired, and the water removal properties will thus be impaired. If the content exceeds 75 parts by mass, the addition amount of the water-soluble monofunctional ethylenic unsaturated monomer, which is a polymerizable component, decreases, and the support material will become soft and its self-standing properties will be impaired, so that the supportability of the support material will thus be impaired.

Regarding the contents of the components other than the polyalkylene glycol having an oxybutylene group, the content of the above-mentioned water-soluble monofunctional ethylenic unsaturated monomer is preferably 19 parts by mass or more and 80 parts by mass or less, and the content of the photopolymerization initiator is preferably 2 parts by mass or more and 20 parts by mass or less, with respect to the total mass of the composition for a support material taken as 100 parts by mass.

It is preferable that the composition for a support material of this embodiment further contains a surface controlling agent, and the content of the surface controlling agent is preferably 0.005 parts by mass or more and 3.0 parts by mass or less with respect to the total mass of the composition for a support material taken as 100 parts by mass. When the composition for a support material contains the surface controlling agent, exhibited is an effect of adjusting the surface tension of the composition for a support material such that surface tension suitable for a composition for a support material to be used in an ink-jet system is obtained.

It is preferable that the composition for a support material of this embodiment further contains a water-soluble organic solvent, and the content of the water-soluble organic solvent is preferably 30 parts by mass or less with respect to the total mass of the composition for a support material taken as 100 parts by mass. When the composition for a support material contains the water-soluble organic solvent, exhibited is an effect of adjusting the viscosity of the composition for a support material such that viscosity suitable for a composition for a support material to be used in an ink-jet system is obtained.

It is preferable that the composition for a support material of this embodiment further contains a storage stabilizer. The polymerization of the above-mentioned water-soluble monofunctional ethylenic unsaturated monomer can thus be suppressed even though the composition for a support material is stored for a long period of time, thus making it possible to prevent head clogging while the composition for a support material is being ejected in an ink-jet printer.

Hereinafter, the components of the composition for a support material of this embodiment will be described.

Polyalkylene Glycol having Oxybutylene Group

The above-mentioned polyalkylene glycol having an oxybutylene group is a water-soluble resin for imparting moderate hydrophilicity to a support material, and adding the polyalkylene glycol having an oxybutylene group makes it possible to provide a support material having both water removal properties and supportability. There is no particular limitation on the structure of the alkylene moiety of the polyalkylene glycol having an oxybutylene group as long as the polyalkylene glycol has an oxybutylene group, and only polybutylene glycol having only an oxybutylene group (oxytetramethylene group) may be used or polybutylene polyoxyalkylene glycol (e.g., polybutylene polyethylene glycol) having an oxybutylene group and another oxyalkylene group may be used, for example. However, when the alkylene oxide adduct having an oxypropylene group described in Patent Document 1 is excluded, the polyalkylene glycol having an oxybutylene group is polybutylene polyoxyalkylene glycol having an oxybutylene group and an oxyalkylene group other than an oxypropylene group.

The above-mentioned polybutylene glycol is represented by Chemical Formula (1) below, and the above-mentioned polybutylene polyethylene glycol is represented by Chemical Formula (2) below.

$$HO(CH_2CH_2CH_2CH_2O)_nH \qquad (1)$$

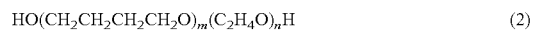

$$HO(CH_2CH_2CH_2CH_2O)_m(C_2H_4O)_nH \qquad (2)$$

In Chemical Formula (1), n is preferably an integer of 5 to 400, and more preferably 5 to 250. In Chemical Formula (2), it is preferable that m is an integer of 5 to 300, and n is an integer of 2 to 150. It is more preferable that m is 6 to 200, and n is 3 to 100. The oxybutylene groups in Chemical Formula (1) and Chemical Formula (2) may be linear or branched.

Water-soluble Monofunctional Ethylenic Unsaturated Monomer

The above-mentioned water-soluble monofunctional ethylenic unsaturated monomers polymerize and form a constituent component of the support material, and supportability is thus exhibited. The water-soluble monofunctional ethylenic unsaturated monomer is water-soluble, but imparts hardness to the support material and improves supportability.

Examples of the water-soluble monofunctional ethylenic unsaturated monomer include hydroxy group-containing (meth)acrylates having 5 to 15 carbon atoms (C5-15) (e.g., hydroxyethyl (meth)acrylate, hydroxypropyl (meth)acrylate, and 4-hydroxybutyl (meth)acrylate), alkylene oxide adduct-containing (meth)acrylates having a number-average molecular weight (Mn) of 200 to 1000 (e.g., polyethylene glycol mono(meth)acrylate, monoalkoxy (C1-4) polyethylene glycol mono(meth)acrylate, polypropylene glycol mono (meth)acrylate, monoalkoxy (C1-4)polypropylene glycol mono(meth)acrylate, and mono(meth)acrylate of PEG-PPG block polymer), C3-15 (meth)acrylamide derivatives (e.g., (meth)acrylamide, N-methyl (meth)acrylamide, N-ethyl (meth)acrylamide, N-propyl (meth)acrylamide, N-butyl (meth)acrylamide, N,N dimethyl (meth)acrylamide, N,N'-diethyl (meth)acrylamide, N-hydroxyethyl (meth)acrylamide, N-hydroxypropyl (meth)acrylamide, and N-hydroxybutyl (meth)acrylamide), and (meth)acryloylmorpholine. The above-mentioned water-soluble monofunctional ethylenic unsaturated monomers may be used alone or in combination of two or more.

As described above, the content of the water-soluble monofunctional ethylenic unsaturated monomer is preferably 19 parts by mass or more and 80 parts by mass or less with respect to the total mass of the composition for a support material taken as 100 parts by mass. If the content is smaller than 19 parts by mass, the supportability of the support material is likely to be impaired. If the content exceeds 80 parts by mass, the water removal properties of the support material are likely to be impaired.

The mass ratio of the polyalkylene glycol having an oxybutylene group contained in the composition for a support material of this embodiment to the water-soluble monofunctional ethylenic unsaturated monomer contained therein is preferably 3:16 to 15:4.

Photopolymerization Initiator

The above-mentioned photopolymerization initiator initiates a monomer polymerization reaction or a monomer cross-linking reaction using an energy beam. The composition for a support material of this embodiment contains the photopolymerization initiator, thus making it possible to cure the ejected composition for a support material through irradiation with an energy beam in ink-jet stereolithography.

For example, an energy beam selected as appropriate from ultraviolet rays within 200 to 400 nm, far ultraviolet rays, a g-line, an h-line, an i-line, a KrF excimer laser beam, an ArF excimer laser beam, an electron beam, X-rays, a molecular beam, an LED beam, an ion beam, and the like can be used as the energy beam with which the photopolymerization initiator is irradiated. In particular, an LED beam is desirable from the viewpoint of reducing power consumption.

There is no particular limitation on the photopolymerization initiator as long as it can initiate the polymerization with low energy, but it is preferable to use a photopolymerization initiator containing at least one compound selected from the group consisting of acylphosphine oxide compounds, α-aminoalkylphenone compounds, and thioxanthone compounds as the photopolymerization initiator. In particular, a combination of an acylphosphine oxide compound and a thioxanthone compound, and a combination of an α-aminoalkylphenone compound and a thioxanthone compound are preferable.

Specific examples of the acylphosphine oxide compounds include 2,4,6-trimethylbenzoyldiphenylphosphine oxide, 2,6-dimethoxybenzoyldiphenylphosphine oxide, 2,6-dichlorobenzoyldiphenylphosphine oxide, 2,3,5,6-tetramethylbenzoyldiphenylphosphine oxide, 2,6-dimethylbenzoyldiphenylphosphine oxide, 4-methylbenzoyldiphenylphosphine oxide, 4-ethylbenzoykliphenylphosphine oxide, 4-isopropylbenzoyldiphenylphosphine oxide, 1-methylcyclohexanoylbenzoyldiphenylphosphine oxide, bis(2,4,6-trimethylbenzoyl)-phenylphosphine oxide, 2,4,6-trimethylbenzoylphenylphosphinic acid methyl ester, 2,4,6-trimethylbenzoylphenylphosphinic acid isopropyl ester, and bis(2,6-dimethoxybenzoyl)-2,4,4-trimethylpentylphosphine oxide. These compounds may be used alone or by mixing two or more. An example of commercially available acylphosphine oxide compounds is "DAROCURE TPO", which is manufactured by BASF.

Specific examples of the α-aminoalkylphenone compounds include 2-methyl-1-[4-(methylthio)phenyl]-2-morpholinopropan-1-one, and 2-benzyl-2-climethylamino-1-(4-morpholinophenyl)butanone-1,2-methyl-1-[4-(methoxy thio)-phenyl]-2-morpholinopropan-2-one. These compounds may be used alone or by mixing two or more. Examples of commercially available α-aminoalkylphenone compounds include "IRGACURE 369" and "IRGACURE 907", which are manufactured by BASF.

Specific examples of the thioxanthone compounds include thioxanthone, 2-methylthioxanthone, 2-ethylthioxanthone, 2-isopropylthioxanthone, 4-isopropylthioxanthone, 2-chlorothioxanthone, 2,4-dimethylthioxanthone, 2,4-diethylthioxanthone, 2,4-dichlorothioxanthone, and 1-chloro-4-propoxythioxanthone. These compounds may be used alone or by mixing two or more. Examples of commercially available thioxanthone compounds include "KAYACURE DETX-S", which is manufactured by Nippon Kayaku Co., Ltd., and "Chivacure ITX", which is manufactured by Double Bond Chemical Ind. Co., Ltd.

As described above, the content of the photopolymerization initiator is preferably 2 parts by mass or more and 20 parts by mass or less with respect to the total mass of the composition for a support material taken as 100 parts by mass. If the content is smaller than 2 parts by mass, the curability of the support material is likely to be impaired. If the content exceeds 20 parts by mass, the low-temperature stability of the composition for a support material is likely to be impaired. That is, when the temperature of the composition for a support material falls, the solubility of the photopolymerization initiator decreases, and a potion thereof cannot dissolve in the composition for a support material and is likely to precipitate.

The composition for a support material of this embodiment may contain, as other components, additives such as a surface controlling agent, a water soluble organic solvent, and a storage stabilizer.

Surface Controlling Agent

Examples of the surface controlling agent include silicone compounds and fluorine compounds. In particular, silicone compounds are preferable. When the composition for a support material contains the surface controlling agent, exhibited is an effect of adjusting the surface tension of the composition for a support material such that surface tension suitable for a composition for a support material to be used in an ink-jet system is obtained.

Specific examples (whose trade names are shown) of the silicone compounds include BYK-300, BYK-302, BYK-306, BYK-307, BYK-310, BYK-315, BYK-320, BYK-322, BYK-323, BYK-325, BYK-330, BYK-331, BYK-333, BYK-337, BYK-344, BYK-370, BYK-375, BYK-377, BYK-UV3500, BYK-UV3510, and BYK-UV3570, which are manufactured by BYK-chemie; TEGO-Rad2100, TEGO-Rad2200N, TEGO-Rad2250, TEGO-Rad2300, TEGO-Rad2500, TEGO-Rad2600, and TEGO-Rad2700, which are manufactured by Evonik Japan; and GLANOL 100, GLANOL 115, GLANOL 400, GLANOL 410, GLANOL 435, GLANOL 440, GLANOL 450, B-1484, POLYFLOW ATF-2, KL-600, UCR-L72, and UCR-L93, which are manufactured by Kyoeisha Chemical Co., Ltd. These compounds may be used alone or by mixing two or more.

As described above, the content of the surface controlling agent is preferably 0.005 parts by mass or more and 3.0 parts by mass or less with respect to the total mass of the composition for a support material taken as 100 parts by mass. If the content is smaller than 0.005 parts by mass, the effect of the surface controlling agent is not likely to be exhibited. If the content exceeds 3.0 parts by mass, undissolved materials or bubbles are likely to be formed in the composition for a support material.

Water-soluble Organic Solvent

Examples of the water-soluble organic solvent include ethylene glycol, diethylene glycol, triethylene glycol, propylene glycol, dipropylene glycol, 2-pyrrolidone, N-methyl-2-pyrrolidone, 1,2-propanediol, 1,3-propanediol, 1,2-butanecliol, 1,3-butanediol, 1,4-butanediol, 2,3-butanediol, 2,2- dimethyl-1,3-propanediol, 2-methyl-1,3-propanediol, 1,2-pentanecliol, 1,5-pentanecliol, 2,4-pentanediol, 1,2-hexanediol, 3,5-dimethyl-3-hexyne-2,5-diol, 2,5-hexanediol, hexylene glycol, 1,6-hexanediol, 2-ethyl-1,3-hexanecliol, 2,2,4-trimethyl-1,3-pentanediol, 2,5-dimethyl-2,5-hexanediol, sulfolane, 1,4-cyclohexanecliimethanol, 2,2-thiodiethanol, 3-pyridylcarbinol, propylene glycol monomethyl ether, dipropylene glycol methyl ether, tripropylene glycol methyl ether, propylene glycol ethyl ether, propylene glycol n-propyl ether, dipropylene glycol n-propyl ether, tripropylene glycol n-propyl ether, propylene glycol n-butyl ether, dipropylene glycol n-butyl ether, tripropylene glycol n-butyl ether, propylene glycol t-butyl ether, dipropylene glycol t-butyl ether, propylene glycol phenyl ether, ethylene glycol methyl ether, diethylene glycol methyl ether, triethylene glycol methyl ether, ethylene glycol ethyl ether, diethylene glycol ethyl ether, triethylene glycol ethyl ether, ethylene glycol n-propyl ether, ethylene glycol n-butyl ether, diethylene glycol n-butyl ether, triethylene glycol n-butyl ether, ethylene glycol n-hexyl ether, diethylene glycol n-hexyl ether, and ethylene glycol phenyl ether.

When the composition for a support material contains the water-soluble organic solvent, exhibited is an effect of adjusting the viscosity of the composition for a support material such that viscosity suitable for a composition for a support material to be used in an inkjet system is obtained.

As described above, the content of the water-soluble organic solvent is preferably 30 parts by mass or less with respect to the total mass of the composition for a support material taken as 100 parts by mass. If the content exceeds 30 parts by mass, the water-soluble organic solvent is separated from the support material and exudes therefrom, and thus the supportability is likely to be impaired.

Storage Stabilizer

Examples of the storage stabilizer include hindered amine-based compounds (HALSs), phenol-based antioxidants, and phosphorus-based antioxidants. Specific examples thereof include hydroquinone, methoquinone, benzoquinone, p-methoxyphenol, hydroquinone monomethyl ether, hydroquinone monobutyl ether, TEMPO, TEMPOL, cupferron Al, t-butylcatechol, and pyrogallol. These storage stabilizers can be used alone or in combination of two or more.

Among the above-mentioned storage stabilizers, HALSs, methoquinone, and hydroquinone are preferable. In particular, it is preferable to use a combination of HALSs and methoquinone, or a combination of HALSs and hydroquinone.

In general, the storage stabilizer is used at a content of 0.005 parts by mass or more and 1 part by mass or less with respect to the total mass of the composition for a support material taken as 100 parts by mass. The content is more preferably 0.05 parts by mass or more and 0.5 parts by mass or less.

The composition for a support material of this embodiment is used along with a desired composition for a model material. Hereinafter, an embodiment of a composition for a model material that can be used along with the composition for a support material of the above-mentioned embodiment will be specifically described.

The composition for a model material of this embodiment contains a monofunctional ethylenic unsaturated monomer (a), a polyfunctional ethylenic unsaturated monomer having two or more functional groups (b), an oligomer (c), a photopolymerization initiator (d), and a surface controlling agent (e).

It is particularly preferable that the composition for a model material of this embodiment consists of 19 to 49 parts by mass of the monofunctional ethylenic unsaturated monomer (a), 15 to 50 parts by mass of the polyfunctional ethylenic unsaturated monomer having two or more functional groups (b), 10 to 45 parts by mass of the oligomer (c), 3 to 15 parts by mass of the photopolymerization initiator (d), and 0.005 to 3.0 parts by mass of the surface controlling agent (e), with respect to the total mass of the composition for a model material taken as 100 parts by mass.

Monofunctional Ethylenic Unsaturated Monomer (a)

The monofunctional ethylenic unsaturated monomer (a) is a component that polymerizes through irradiation with light and thus cures the composition for a model material. The content of the component (a) is set to 19 to 49 parts by mass with respect to the total mass of the composition for a model material taken as 100 parts by mass. If the content of the component (a) is smaller than 19 parts by mass, the model material obtained through photo-curing of the composition for a model material will have large cure shrinkage. As a result, the dimensional accuracy of the model material decreases. On the other hand, if the content of the component (a) exceeds 49 parts by mass, the model material obtained through photo-curing of the composition for a model material will be deficient in curability. As a result, the dimensional accuracy of the model material decreases. The content of the component (a) is preferably 25 parts by mass or more and 47 parts by mass or less.

The component (a) is a polymerizable monomer having a single ethylenic double bond in its molecule that has energy beam curing characteristics. Examples of the component (a) include linear or branched alkyl (meth)acrylates having 4 to 30 carbon atoms (e.g., methyl (meth)acrylate, ethyl (meth)acrylate, isobutyl (meth)acrylate, lauryl (meth)acrylate, stearyl (meth)acrylate, isostearyl (meth)acrylate, and t-butyl (meth)acrylate), alicyclic (meth)acrylates having 6 to 20 carbon atoms (e.g., cyclohexyl (meth)acrylate, 4-t-cyclohexyl (meth)acrylate, isobornyl (meth)acrylate, phenoxyethyl (meth)acrylate, and dicyclopentanyl (meth)acrylate), heterocyclic (meth)acrylates having 5 to 20 carbon atoms (e.g., tetrahydrofurfuryl (meth)acrylate, 4-(meth)acryloyloxymethyl-2-methyl-2-ethyl-1,3-clioxolane, 4-(meth)acryloyloxymethyl-2-cyclohexyl-1,3-dioxolane, and adamantyl (meth)acrylate), and acryloylmorpholine. These compounds may be used alone or in combination of two or more. When two or more types of components (a) are contained, the above-mentioned content is determined as the sum of the contents of the components (a).

In particular, isobornyl (meth)acrylate, phenoxyethyl (meth)acrylate, and tetrahydrofurfuryl (meth)acrylate are preferable from the viewpoint of improving the curability of the composition for a model material. Furthermore, isobornyl (meth)acrylate is more preferable from the viewpoint that the composition for a model material is imparted with heat resistance with which it can withstand temperatures (50 to 90° C.) during photo-curing, and the dimensional accuracy of the model material is thus improved.

Polyfunctional Ethylenic Unsaturated Monomer having Two or more Functional Groups (b)

The polyfunctional ethylenic unsaturated monomer having two or more functional groups (b) is a component that polymerizes through irradiation with light and thus cures the composition for a model material. The content of the component (b) is set to 15 to 50 parts by mass with respect to the total mass of the composition for a model material taken as 100 parts by mass. If the content of the component (b) is smaller than 15 parts by mass, the model material obtained through photo-curing of the composition for a model material will be deficient in curability. As a result, the dimensional accuracy of the model material decreases. On the other hand, if the content of the component (b) exceeds 50 parts by mass, the model material obtained through photo-curing of the composition for a model material will have large cure shrinkage. As a result, the dimensional accuracy of the model material decreases. The content of the component (b) is preferably 20 parts by mass or more and 45 parts by mass or less.

The component (b) is a polymerizable monomer that has two or more ethylenic double bonds in its molecule and has energy beam curing characteristics. Examples of the component (b) include linear or branched alkylene glycol di(meth)acrylates or alkylene glycol tri(meth)acrylates having 10 to 25 carbon atoms (e.g., tripropylene glycol di(meth)acrylate, 1,6-hexanediol di(meth)acrylate, neopentyl glycol di(meth)acrylate, 1,9-nonanediol di(meth)acrylate, 3-methyl-1,5-pentanediol di(meth)acrylate, 2-n-butyl-2-ethyl-1,3-propanediol di(meth)acrylate, and pentaerythritol tri(meth)acrylate), and alicyclic di(meth)acrylates having 10 to 30 carbon atoms (e.g., dimethylol tricyclodecane di(meth)acrylate). These compounds may be used alone or in combination of two or more. When two or more types of components (b) are contained, the above-mentioned content is determined as the sum of the contents of the components (b).

In particular, tripropylene glycol di(meth)acrylate, 1,6-hexanediol di(meth)acrylate, and pentaerythritol tri(meth)acrylate are preferable from the viewpoint of improving the curability of the composition for a model material. Furthermore, 1,6-hexanediol di(meth)acrylate and pentaerythritol tri(meth)acrylate are more preferable from the viewpoint that the composition for a model material is imparted with heat resistance with which it can withstand temperatures (50 to 90° C.) during photo-curing, and the dimensional accuracy of the model material is thus improved.

Oligomer (c)

The oligomer (c) is a component that polymerizes through irradiation with light and thus cures the composition for a model material and enhances the breaking strength of the model material obtained through the curing. The content of the component (c) is set to 10 to 45 parts by mass with respect to the total mass of the composition for a model material taken as 100 parts by mass. If the content of the component (c) is smaller than 10 parts by mass, the model material obtained through photo-curing of the composition for a model material will have slightly large cure shrinkage. As a result, the dimensional accuracy of the model material may decrease. In addition, the model material obtained through photo-curing of the composition for a model material will have poor breaking strength. On the other hand, if the content of the component (c) exceeds 45 parts by mass, the composition for a model material will have a high viscosity. Therefore, when the composition for a model material is ejected from an ink jet head, the trajectory may curve due to poor jetting characteristics. As a result, the dimensional accuracy of the model material obtained through photo-curing of the composition for a model material may decrease. The content of the component (c) is preferably 15 parts by mass or more and 30 parts by mass or less.

Examples of the component (c) include urethane (meth)acrylate oligomer, epoxy (meth)acrylate oligomer, polyester (meth)acrylate oligomer, and polyether (meth)acrylate oligomer. In particular, one or more oligomers selected from urethane (meth)acrylate oligomer, epoxy (meth)acrylate oligomer, and polyester (meth)acrylate oligomer are preferable from the viewpoint of improving the curability of the composition for a model material. Furthermore, urethane (meth)acrylate oligomer is more preferable from the viewpoint that the composition for a model material is imparted with heat resistance with which it can withstand temperatures (50 to 90° C.) during photo-curing, and the dimensional accuracy of the model material is thus improved. These oligomers may be used alone or in combination of two or more. When two or more types of components (c) are contained, the above-mentioned content is determined as the sum of the contents of the components (c).

In this specification, the "oligomer" has a weight-average molecular weight of 800 to 10000. Here, the term "weight-average molecular weight" means a weight-average molecular weight in terms of polystyrene measured through GPC (Gel Permeation Chromatography).

Photopolymerization Initiator (d)

There is no particular limitation on the photopolymerization initiator (d) as long as it is a compound that promotes radical reaction when irradiated with ultraviolet rays, near-ultraviolet rays, or light of a wavelength within the visible light region. Examples of the component (d) include benzoin compounds having 14 to 18 carbon atoms (e.g., benzoin, benzoin methyl ether, benzoin ethyl ether, benzoin propyl ether, and benzoin isobutyl ether), acetophenone compounds having 8 to 18 carbon atoms (e.g., acetophenone, 2,2-diethoxy-2-phenylacetophenone, 1,1-dichloroacetophenone, 2-hydroxy-2-methyl-phenylpropan-1-one, diethoxyacetophenone, 1-hydroxycyclohexylphenyl ketone, and 2-methyl-1-[4-(methylthio)phenyl]-2-morpholinopropan-1-one), anthraquinone compounds having 14 to 19 carbon atoms (e.g., 2-ethylanthraquinone, 2-t-butylanthraquinone, 2-chloroanthraquinone, and 2-amylanthraquinone), thioxanthone compounds having 13 to 17 carbon atoms (e.g., 2,4-diethylthioxanthone, 2-isopropylthioxanthone, and 2-chlorothioxanthone), ketal compounds having 16 or 17 carbon atoms (e.g., acetophenone dimethyl ketal and benzyldimethyl ketal), benzophenone compounds having 13 to 21 carbon atoms (e.g., benzophenone, 4-benzoyl-4'-methyldiphenyl sulfide, and 4,4'-bismethylaminobenzophenone), acylphosphine oxide compounds having 22 to 28 carbon atoms (e.g., 2,4,6-trimethylbenzoyl-diphenyl-phosphine oxide, bis-(2,6-dimethoxybenzoyl)-2,4,4-trimethylpentyl-phosphine oxide, and bis(2,4,6-trimethylbenzoyn-phenyl-phosphine oxide), and mixtures of these compounds. These compounds may be used alone or in combination of two or more. In particular, 2,4,6-trimethylbenzoyl-diphenyl-phosphine oxide is preferable from the viewpoint of light resistance, that is, the model material obtained through photo-curing of the composition for a model material is less likely to turn yellow. Examples of available acylphosphine oxide compounds include "DAROCURE TPO", which is manufactured by BASF, and the like.

The content of the component (d) is 3 to 15 parts by mass with respect to the total mass of the composition for a model material taken as 100 parts by mass. If the content of the component (d) is within the above-mentioned range, the composition for a model material will have favorable curability, and the dimensional accuracy of the model material will thus increase. The content of the component (d) is preferably 5 parts by mass or more and 13 parts by mass or less. When two or more types of components (d) are contained, the above-mentioned content is determined as the sum of the contents of the components (d).

Surface Controlling Agent (e)

The surface controlling agent (e) is added in order to adjust the surface tension of the composition for a model material within an appropriate range. Adjusting the surface tension of the composition for a model material within an appropriate range makes it possible to suppress the mixing (what is called bleeding) of the composition for a model material and the composition for a support material at the interface therebetween. As a result, the composition for a model material and the composition for a support material can be used to obtain a stereolithographic product with favorable dimensional accuracy. In order to obtain this effect, the content of the component (e) is set to 0.005 to 3.0 parts by mass with respect to the total mass of the composition for a model material taken as 100 parts by mass.

Examples of the component (e) include silicone compounds and the like. Examples of the silicone compounds include silicone compounds having a polydimethylsiloxane structure. Specific examples thereof include polyether-modified polydimethylsiloxane, polyester-modified polydimethylsiloxane, and polyaralkyl-modified polydimethylsiloxane. Specifically, the following compounds (whose trade names are shown) may be used, for example: BYK-300, BYK-302, BYK-306, BYK-307, BYK-310, BYK-315, BYK-320, BYK-322, BYK-323, BYK-325, BYK-330, BYK-331, BYK-333, BYK-337, BYK-344, BYK-370, BYK-375, BYK-377, BYK-UV3500, BYK-UV3510, and BYK-UV3570, which are manufactured by BYK-chemie; TEGO-Rad2100, TEGO-Rad2200N, TEGO-Rad2250, TEGO-Rad2300, TEGO-Rad2500, TECO-Rad2600, and TEGO-Rad2700, which are manufactured by Evonik Japan; and GLANOL 100, GLANOL 115, GLANOL 400, GLANOL 410, GLANOL 435, GLANOL 440, GLANOL 450, B-1484, POLYFLOW ATF-2, KL-600, UCR-L72, and UCR-L93, which are manufactured by Kyoeisha Chemical Co., Ltd. These compounds may be used alone or in combination of two or more. When two or more types of components (e) are contained, the above-mentioned content is determined as the sum of the contents of the components (e).

Storage Stabilizer (f)

It is preferable that the composition for a model material of this embodiment further contains a storage stabilizer (f). The storage stabilizer (f) can enhance the storage stability of the composition for a model material. In addition, the storage stabilizer (f) can prevent the occurrence of head clogging caused by the polymerization of polymerizable compounds induced by thermal energy. In order to obtain these effects, the content of the component (f) is preferably 0.05 to 3.0 parts by mass with respect to the total mass of the composition for a model material taken as 100 parts by mass.

Examples of the component (f) include hindered amine-based compounds (HALSs), phenol-based antioxidants, and phosphorus-based antioxidants. Specific examples thereof include hydroquinone, methoquinone, benzoquinone, p-methoxyphenol, hydroquinonemonomethyl ether, hydroquinonemonobutyl ether, TEMPO, 4-hydroxy-TEMPO, TEMPOL, cupferron Al, IRGASTAB UV-10, IRGASTAB UV-22, FIRSTCURE ST-1 (manufactured by ALBEMARLE), t-butylcatechol, pyrogallol, and TINUVIN 111 FDL, TINUVIN 144, TINUVIN 292, TINUVIN XP40, TINUVIN XP60, and TINUVIN 400, which are manufactured by BASF. These compounds may be used alone or in combination of two or more. When two or more types of components (f) are contained, the above-mentioned content is determined as the sum of the contents of the components (f).

Amine-modified Reactive Oligomer (g)

The composition for a model material of this embodiment can further contain an amine-modified reactive oligomer (g). The amine-modified reactive oligomer (g) is a reactive oligomer having at least one or more amino group (tertiary amine skeleton) in its molecule. Examples of such a reactive oligomer (g) include amine-modified oligomers such as amine-modified polyether (meth)acrylates, amine-modified polyester (meth)acrylates, amine-modified epoxy (meth)acrylates, and amine-modified urethane (meth)acrylates. These oligomers may be used alone or in combination of two or more.

It is desirable that the amine-modified reactive oligomer (g) to be used preferably has a weight-average molecular weight of 500 or more, and more preferably 600 or more, from the viewpoint of reducing the cure shrinkage of the model material. In addition, it is desirable that the amine-modified reactive oligomer (g) preferably has a weight-average molecular weight of 2000 or less, more preferably 1500 or less, from the viewpoint of reducing the viscosity of the composition for a model material. Here, the term "weight-average molecular weight" means a molecular weight in terms of polystyrene obtained by measuring the oligomer alone through GPC (solvent: tetrahydrofuran).

It is desirable that the content of the amine-modified reactive oligomer (g) is preferably 3 parts by mass or more, and more preferably 5 parts by mass or more, with respect to the total mass of the composition for a model material, from the viewpoint of the curability of the composition for a mode material. In addition, it is desirable that the content of the amine-modified reactive oligomer (g) is preferably 30 parts by mass or less, and more preferably 20 parts by mass or less, with respect to the total mass of the composition for a model material, from the viewpoint of preventing an increase in hygroscopicity of the composition for a model material or the shaped article.

Other additives can be added to the composition for a model material as needed. Examples of the other additives include antioxidants, coloring agents, ultraviolet absorbing agents, light stabilizers, polymerization inhibitors, chain transfer agents, and fillers.

Although there is no particular limitation on a method for manufacturing the composition for a model material of this embodiment, the composition for a model material can be manufactured by using a mixing-stirring apparatus to uniformly mix the above-mentioned components (a) to (e), and optionally the component (f), the component (g), and other additives, for example.

The thus manufactured composition for a model material of this embodiment preferably has a viscosity of 70 mPa·s or less at 25° C. from the viewpoint of smooth ejection from an ink-jet head. The viscosity of the composition for a model material can be measured using an R100-type viscometer in conformity with Japanese Industrial Standards (TIS) Z 8803.

EXAMPLES

Hereinafter, the present invention will be described in detail based on examples. However, the present invention is not limited to the following examples. In the following description, "part" means "part by mass", unless otherwise stated.

Table 1 shows components used in compositions for a support material of examples and comparative examples below.

TABLE 1

| Component | Name | Content/Trade name, specification |
|---|---|---|
| Polyalkylene glycol having oxybutylene group (A) (water-soluble resin) | PTMG | Polybutylene polyethylene glycol/manufactured by NOF Corporation Trade name: POLYCERIN DC1100 (molecular weight: 1000) |
| Water soluble resin (B) | PEG | Polyethylene glycol/manufactured by Sanyo Chemical Industries Ltd. Trade name: PEG-1500 (molecular weight: 1500) |
| | PPG | Polypropylene glycol/manufactured by Sanyo Chemical Industries Ltd. Trade Name: SANNIX PP-1000 (molecular weight: 1000) |
| Water-soluble monofunctional ethylenic unsaturated monomer (C) | ACMO | Aayloylmorpholine/manufactured by DKSH Trade name: ACMO (ethylenic double bond/one molecule: one bond) |
| | HEAA | Hydroxyethyl acrylamide/manufactured by KJ Chemicals Corporation Trade name: HEAA (ethylenic double bond/one molecule: one bond) |
| Photopolymerization initiator (D) (acylphosphine oxide-based) | DAROCURE TPO | 2,4,6-Trimethylbenzoyl-diphenyl-phosphine oxide/manufactured by BASF Trade name: DAROCURE TPO |
| Surface controlling agent (E) (silicone-based) | TEGO-Rad2100 | Silicon acrylate having polydimethylsiloxane structure/manufactured by Evonik Japan Trade name: TEGO-Rad2100 |
| Water-soluble organic solvent (F) | MDG | Diethylene glycol monomethyl ether/manufactured by Nippon Nyukazai Co. Ltd. Trade name: MDG |
| Storage stabilizer (G) | H-TEMPO | 4-Hydroxy-2,2,6,6-tetramethylpiperidine-N-oxyl/manufactured by Evonik Japan Trade name: 4-HYDROXY-TEMPO |

Examples 1 to 10 and Comparative Examples 1 to 8

First, compositions for a support material of Examples 1 to 10 and Comparative Examples 1 to 8 were prepared as follows. That is, each composition for a support material was prepared by weighing out the components (A) to (G) shown in Tables 2 and 3 in accordance with the blend amounts (unit: part by mass) shown in Tables 2 and 3, placing them in a plastic bottle, and mixing them.

TABLE 2

| Component | Name | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| Polyalkylene glycol having oxybutylene group (A) (water-soluble resin) | PTMG | 15 | 35 | 50 | 75 | 25 | 50 | 40 | 50 | 35 | 35 |
| Water-soluble resin (B) | PEG | — | — | — | — | — | — | — | — | — | — |
| | PPG | — | — | — | — | — | — | — | — | — | — |
| Water-soluble monofunctional ethylenic unsaturated monomer (C) | ACMO | 79.8 | 59.8 | 44.8 | 19.8 | 39.8 | 47.8 | 39.8 | — | 59.9 | 60.0 |
| | HEAA | — | — | — | — | — | — | — | 44.8 | — | — |
| Photopolymerization initiator (D) (acylphosphine oxide-based) | DAROCURE TPO | 5 | 5 | 5 | 5 | 5 | 2 | 20 | 5 | 5 | 5 |
| Surface controlling agent (E) (silicone-based) | TEGO-Rad 2100 | 0.1 | 0.1 | 0.1 | 0.1 | 0.1 | 0.1 | 0.1 | 0.1 | — | — |
| Water-soluble organic solvent (F) | MDG | — | — | — | — | 30 | — | — | — | — | — |
| Storage stabilizer (G) | H-TEMPO | 0.1 | 0.1 | 0.1 | 0.1 | 0.1 | 0.1 | 0.1 | 0.1 | 0.1 | — |
| Total | | 100.0 | 100.0 | 100.0 | 100.0 | 100.0 | 100.0 | 100.0 | 100.0 | 100.0 | 100.0 |

TABLE 3

| Component | Name | Comp. Ex. 1 | Comp Ex. 2 | Comp Ex. 3 | Comp Ex. 4 | Comp Ex. 5 | Comp Ex. 6 | Comp Ex. 7 | Comp Ex. 8 |
|---|---|---|---|---|---|---|---|---|---|
| Polyalkylene glycol having oxybutylene group (A) (water-soluble resin) | PTMG | — | — | — | — | — | — | 10 | 85 |
| Water-soluble resin (B) | PEG | 15 | 50 | 75 | — | — | — | — | — |
|  | PPG | — | — | — | 15 | 50 | 75 | — | — |
| Water-soluble monofunctional ethylenic unsaturated monomer (C) | ACMO | 79.8 | 44.8 | 19.8 | 79.8 | 44.8 | 19.8 | 84.8 | 9.8 |
|  | HEAA | — | — | — | — | — | — | — | — |
| Photopolymerization initiator (D) (acylphosphine oxide-based) | DAROCURE TPO | 5 | 5 | 5 | 5 | 5 | 5 | 5 | 5 |
| Surface controlling agent (E) (silicone-based) | TEGO-Rad 2100 | 0.1 | 0.1 | 0.1 | 0.1 | 0.1 | 0.1 | 0.1 | 0.1 |
| Water-soluble organic solvent (F) | MDG | — | — | — | — | — | — | — | — |
| Storage stabilizer (G) | H-TEMPO | 0.1 | 0.1 | 0.1 | 0.1 | 0.1 | 0.1 | 0.1 | 0.1 |
| Total |  | 100.0 | 100.0 | 100.0 | 100.0 | 100.0 | 100.0 | 100.0 | 100.0 |

Next, regarding the compositions for a support material of Examples 1 to 10 and Comparative Examples 1 to 8, the low-temperature stability of a composition for a support material, and the stability under high-temperature and high-humidity conditions (supportability) and water removal properties of a support material cured article obtained by curing a composition for a support material were evaluated.

Low-temperature Stability of Composition for a Support Material

The stability of the compositions for a support material at low temperatures was evaluated. A material with a low melting point (e.g., PEG) is frozen at low temperatures lower than its melting point, and its liquid state is not maintained. In addition, the solubility of the photopolymerization initiator decreases at low temperatures, and thus a portion thereof cannot dissolve in the composition for a support material and is likely to precipitate. Specifically, each of the compositions for a support material was placed in a glass bottle, and the glass bottle containing the composition for a support material was stored for 24 hours in a constant temperature oven at a temperature of 10° C. Thereafter, the state of the composition for a support material after storage was visually confirmed, and the low-temperature stability of the composition for a support material was evaluated in accordance with the following criteria.

If the liquid state of the composition for a support material was maintained: the low-temperature stability was evaluated as "Good".

If a portion of the composition for a support material solidified (hardened): the low-temperature stability was evaluated as "Fair".

If the composition for a support material solidified (hardened): the low-temperature stability was evaluated as "Poor".

Supportability of Support Material Cured Article.

A frame-shaped silicone rubber with a length of 30 mm, a width of 30 mm, and a thickness of 5 mm was used to form a frame on a glass plate, and each of the composition for a support material was poured into the frame and irradiated with ultraviolet rays using a metal halide lamp until an accumulated light amount reached 500 mJ/cm². A support material cured article was thus produced. Subsequently, the cured article was placed in a glass petri dish, and the petri dish containing the cured article was allowed to stand for 2 hours in a constant temperature oven at a temperature of 40° C. and a relative humidity of 90%. Thereafter, the state of the cured article after being allowed to stand was visually confirmed, and the supportability of the cured article was evaluated in accordance with the following criteria.

If a liquid substance was not formed on the surface of the cured article, and it was not observed that the cured article softened: the supportability was evaluated as "Good".

If a slight amount of liquid substance was formed on the surface of the cured article, and it was observed that the cured article slightly softened: the supportability was evaluated as "Fair".

If a liquid substance was formed on the surface of the cured article, and it was observed that the cured article softened: the supportability was evaluated as "Poor".

Water Removal Properties of Support Material Cured Article

Support material cured articles were produced in the same manner as in the case where the supportability of the support material cured article was evaluated. Next, each of the cured articles was placed in a beaker into which 50 mL of ion-exchanged water had been filled, and was treated using an ultrasonic cleaner while the water temperature was maintained at 25° C. The time elapsed until the cured article dissolved was measured, and the water removal properties of the support material cured article were evaluated in accordance with the following criteria.

If it took 30 minutes until the cured article completely dissolved: the water removal properties were evaluated as "Good".

If it took 1 hour until the cured article completely dissolved: the water removal properties were evaluated as "Fair".

If it took 2 hours until the cured article completely dissolved: the water removal properties were evaluated as "Poor".

Tables 4 and 5 shows the results.

TABLE 4

|  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Low-temperature stability | Good | Good | Good | Good | Good | Good | Good | Good | Good | Good |
| Supportability | Good | Good | Good | Fair | Good | Fair | Good | Good | Good | Good |
| Water removal properties | Fair | Fair | Good | Good | Good | Good | Good | Good | Fair | Fair |

TABLE 5

|  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|
| Low-temperature stability | Fair | Poor | Poor | Good | Good | Good | Good | Good |
| Supportability | Good | Good | Good | Fair | Poor | Poor | Good | Poor |
| Water removal properties | Fair | Good | Good | Fair | Good | Good | Poor | Good |

It can be understood from Tables 4 and 5 that the compositions for a support material of Examples 1 to 10 produced satisfactory results in all of the evaluation categories. On the other hand, regarding the cases of Comparative Examples 1 to 3 in which polyethylene glycol was used as the water-soluble resin, the supportability was evaluated as "Good" in all the cases, but the low-temperature stability was evaluated as "Poor" in the cases of Comparative Examples 2 and 3. Regarding the cases of Comparative Examples 4 to 6 in which polypropylene glycol was used as the water-soluble resin, the low-temperature stability was evaluated as "Good" in all the cases, but the supportability was evaluated as "Poor" in the cases of Comparative Examples 5 and 6. Regarding the case of Comparative Example 7 in which the content of PTMG was smaller than 15 parts by mass, the water removal properties were evaluated as "Poor". Regarding the case of Comparative Example 8 in which the content of PTMG excessed 75 parts by mass, the supportability was evaluated as "Poor". Regarding the cases of Comparative Examples 5 and 6, a relatively large amount of PPG, which is highly hydrophilic, was used, and therefore, a liquid substance was formed on the surface of the support material cured article, and it was confirmed that the support material cured article softened. Accordingly, it is thought that the supportability was impaired.

Next, the compositions for a support material produced as described above and compositions for a model material produced as described below were used in combination to form a cured article including a support material and a model material, and the adhesion between the support material and the model material, the water removal properties of the support material, and the bleeding between the composition for a support material and the composition for a model material were evaluated.

First, compositions for a model material M1, M2, M3, M4, M5, M6, M7, M8, M9, and M10 were prepared by weighing out the components (a) to (g) shown in Table 6 in accordance with the blend amounts (unit: part by mass) shown in Tables 7 and 8 and mixing them.

TABLE 6

| Component | Name | Content/Trade name, specification |
|---|---|---|
| Monofunctional ethylenic unsaturated monomer (a) | IBOA | Isobornyl acrylate/manufactured by ARKEMA Trade name: Sartomer SR506D (ethylenic double bond/one molecule: one bond) |
|  | PEA | Phenoxyethyl acrylate/manufactured by ARKEMA Trade name: Sartomer SR339 (ethylenic double bond/one molecule: one bond) |
|  | ACMO | Acryloylmorpholine/manufactured by DKSH Trade name: ACMO (ethylenic double bond/one molecule: one bond) |
| Polyfunctional ethylenic unsaturated monomer having two or more functional groups (b) | HDDA | 1,6-Hexanediol diacrylate/manufactured by ARKEMA Trade name: Sartomer SR238 (ethylenic double bond/one molecule: two bonds) |
|  | TPGDA | Tripropylene glycol diacrylate/manufactured by ARKEMA Trade name: Sartomer SR306 (ethylenic double bond/one molecule: two bonds) |
|  | PE-3A | Pentaerythritol triaciylate/manufactured by Kyoeisha Chemical Co., Ltd. Trade name: Light Acrylate PE-3A (ethylenic double bond/one molecule: three bonds) |

TABLE 6-continued

| Component | Name | Content/Trade name, specification |
|---|---|---|
| Oligomer (c) | CN991 | Urethane acrylate oligomer/manufactured by ARKEMA Trade name: CN991 (ethylenic double bond/one molecule: two bonds) |
| | CN2203 | Polyester acrylate oligomer/manufactured by ARKEMA Trade name: CN2203 (ethylenic double bond/one molecule: two bonds) |
| Photopolymerization initiator (d) | DAROCURE TPO | 2,4,6-Trimethylbenzoyl-diphenyl-phosphine oxide/manufactured by BASF Trade name: DAROCURE TPO |
| Surface controlling agent (e) | TEGO-Rad 2100 | Silicon acrylate having polydimethylsiloxane structure/manufactured by Evonik Japan Trade name: TEGO-Rad2100 |
| Storage stabilizer (f) | H-TEMPO | 4-Hydroxy-2,2,6,6-tetramethylpiperidine-N-oxyl/manufactured by Evonik Japan Trade name: 4-HYDROXY-TEMPO |
| Amine-modified reactive oligomer (g) | GC1100Z | Amine-modified reactive oligomer/manufactured by Qualipoly Chemical Corp. Trade name: GC1100Z |

TABLE 7

| Component | Name | M1 | M2 | M3 | M4 | M5 |
|---|---|---|---|---|---|---|
| Monofunctional ethylenic unsaturated monomer (a) | IBOA | 46.6 | 46.6 | — | 46.6 | 41.6 |
| | PEA | — | — | 46.6 | — | — |
| | ACMO | — | — | — | — | — |
| Polyfunctional ethylenic unsaturated monomer having two or more functional groups (b) | HDDA | 20 | 20 | 20 | 20 | — |
| | TPGDA | — | — | — | — | 20 |
| | PE-3A | — | — | — | 15 | — |
| Oligomer (c) | CN991 | 25 | — | 25 | 10 | 20 |
| | CN2203 | — | 25 | — | — | — |
| Photopolymerization initiator (d) | DAROCURE TPO | 8 | 8 | 8 | 8 | 8 |
| Surface controlling agent (e) | TEGO-Rad2100 | 0.1 | 0.1 | 0.1 | 0.1 | 0.1 |
| Storage stabilizer (f) | H-TEMPO | 0.3 | 0.3 | 0.3 | 0.3 | 0.3 |
| Amine-modified reactive oligomer (g) | GC1100Z | — | — | — | — | 10 |

TABLE 8

| Component | Name | M6 | M7 | M8 | M9 | M10 |
|---|---|---|---|---|---|---|
| Monofunctional ethylenic unsaturated monomer (a) | IBOA | 26.6 | 9.6 | 19.6 | 59.7 | 56.2 |
| | PEA | — | — | — | — | — |
| | ACMO | 15 | — | — | — | — |
| Polyfunctional ethylenic unsaturated monomer having two or more functional groups (b) | HDDA | 20 | 47 | 60 | 20 | 20 |
| | TPGDA | — | — | — | — | — |
| | PE-3A | — | — | — | — | — |
| Oligomer (c) | CN991 | 25 | 35 | 12 | 12 | 12 |
| | CN2203 | — | — | — | — | — |
| Photopolymerization initiator (d) | DAROCURE TPO | 8 | 8 | 8 | 8 | 8 |
| Surface controlling agent (e) | TEGO-Rad2100 | 0.1 | 0.1 | 0.1 | 0.004 | 3.5 |
| Storage stabilizer (f) | H-TEMPO | 0.3 | 0.3 | 0.3 | 0.3 | 0.3 |
| Amine-modified reactive oligomer (g) | GC1100Z | 5 | — | — | — | — |

Next, as shown in Tables 9 and 10, stereolithographic cured articles including the model material and the support material were produced using, in combination, the compositions for a model material produced as described above and the compositions for a support material of Examples 2 to 6 and Comparative Example 7 produced as previously described.

First, a 10-cm square region was bordered by spacers with a thickness of 1 mm arranged along the four sides on the upper surface of a glass plate (trade name: "GLASS PLATE", which is manufactured by AS ONE Corporation; with a length of 200 mm, a width of 200 mm, and a thickness of 5 mm). Each of the compositions for a support material was poured into this square region and was then irradiated with ultraviolet rays using an ultraviolet LED ("NCCU001E", which is manufactured by Nichia Corporation) such that the total irradiation light amount was 500 mJ/cm$^2$ and cured. Support materials were thus obtained.

Next, a 10-cm square region was bordered by spacers with a thickness of 1 mm arranged along the four sides of each of the support materials. Each of the compositions for a model material was poured into this square region and was then irradiated with ultraviolet rays using an ultraviolet LED ("NCCU001E", which is manufactured by Nichia Corporation) such that the total irradiation light amount was 500 mJ/cm$^2$ and cured. Model materials were thus obtained.

Subsequently, each stereolithographic cured article including the model material and the support material produced as described above was used to evaluate the adhesion between the support material and the model material, and the water removal properties of the support material.

Adhesion

After each of the produced stereolithographic cured articles was allowed to stand in a constant temperature oven at 30° C. for 12 hours, the state of the adhesion between the model material and the support material was visually confirmed, and the adhesion between the support material and the model material was evaluated in accordance with the following criteria.

If the model material and the support material were in close contact with each other: the adhesion was evaluated as "Good".

Although the model material and the support material were in close contact with each other, if they separated from each other when the interface of the model material and the support material was scratched using a fingernail: the adhesion was evaluated as "Fair".

If the model material and the support material separated from each other at the interface therebetween, and the model material warped and separated due to its cure shrinkage: the adhesion was evaluated as "Poor".

Water Removal Properties

Each of the stereolithographic cured articles was placed in a beaker into which 50 mL of ion-exchanged water had been filled, and was treated using an ultrasonic cleaner while the water temperature was maintained at 25° C. The time elapsed until the cured article dissolved was measured, and the water removal properties of the support material were evaluated in accordance with the following criteria.

If it took 30 minutes until the cured article completely dissolved: the water removal properties were evaluated as "Good".

If it took 1 hour until the cured article completely dissolved: the water removal properties were evaluated as "Fair".

If it took 2 hours until the cured article completely dissolved: the water removal properties were evaluated as "Poor".

Next, the compositions for a model material produced as described above and the compositions for a support material of Examples 2 to 6 and Comparative Example 7 produced as previously described were used in combination, and the bleeding was evaluated.

Bleeding

First, in accordance with the combinations shown in Tables 9 and 10, 0.02 mL of the composition for a model material and 0.02 mL of the composition for a support material were dropped on a polyethylene terephthalate film ("A4300", which is manufactured by TOYOBO Co., Ltd.; with a length of 100 mm, a width of 150 mm, and a thickness of 188 μm) using a micropipette. At this time, the positions at which the composition for a model material and the composition for a support material were to be dropped were set such that the distance between the centers of the droplets was 10 mm, and the compositions were dropped such that the droplets were separated from each other. Thereafter, the droplets gradually spread and joined together after about 10 seconds. At this time, the state of the interface between the droplets was visually observed from above, and the bleeding was evaluated in accordance with the following criteria.

If the interface between the layer constituted by the composition for a model material and the layer constituted by the composition for a support material had a linear shape as viewed from above, and the bleeding did not occur: the bleeding was evaluated as "Good".

If the interface between the layer constituted by the composition for a model material and the layer constituted by the composition for a support material became blurred due to the composition for a model material moving to the composition for a support material side (M→S): the bleeding was evaluated as "Poor".

If the interface between the layer constituted by the composition for a model material and the layer constituted by the composition for a support material became blurred due to the composition for a support material moving to the composition for a model material side (S→M): the bleeding was evaluated as "Poor".

Tables 9 and 10 show the results.

TABLE 9

| | Stereolithographic cured article | | | | | |
|---|---|---|---|---|---|---|
| | 1 | 2 | 3 | 4 | 5 | 6 |
| Composition for model material | M1 | M2 | M3 | M4 | M5 | M6 |
| Composition for support material | Ex. 2 | Ex. 3 | Ex. 4 | Ex. 5 | Ex. 2 | Ex.6 |
| Adhesion | Good | Good | Good | Good | Good | Good |
| Water removal properties | Good | Good | Good | Good | Good | Good |
| Bleeding | Good | Good | Good | Good | Good | Good |

TABLE 10

| | Stereolithographic cured article | | | | |
|---|---|---|---|---|---|
| | 7 | 8 | 9 | 10 | 11 |
| Composition for model material | M7 | M8 | M9 | M10 | M1 |
| Composition for support material | Ex. 2 | Ex. 2 | Ex. 2 | Ex. 2 | Comp. Ex. 7 |
| Adhesion | Poor | Poor | Good | Good | Good |
| Water removal properties | Good | Good | Good | Good | Poor |
| Bleeding | Good | Good | Poor | Poor | Good |

Adhesion

As is clear from the results shown in Tables 9 and 10, in the stereolithographic products 1 to 6 and 9 to 11, the model material and the support material were in close contact with each other. On the other hand, in the stereolithographic product 7 in which the content of the component (a) in the composition for a model material was smaller than 19 parts by mass, and the stereolithographic product 8 in which the content of the component (b) in the composition for a model material exceeded 50 parts by mass, the model material and the support material separated from each other at the interface therebetween. As described above, when the adhesion between the model material and the support material is poor, the dimensional accuracy of the stereolithographic product decreases.

Water Removal Properties

As is clear from the results shown in Tables 9 and 10, all of the stereolithographic products 1 to 10 in which the compositions for a support material of the embodiment according to the present invention were used had excellent water removal properties. On the other hand, the stereolithographic product 11 in which the composition for a support material of Comparative Example 7 was used had poor water removal properties.

Bleeding

As is clear from the results shown in Tables 9 and 10, in the stereolithographic products 1 to 8 and 11, the interface between the layer constituted by the composition for a model material and the layer constituted by the composition for a support material had a linear shape, and the bleeding did not occurred. On the other hand, in the stereolithographic product 9 in which the content of the component (e) in the composition for a model material was smaller than 0.005 parts by mass, and the stereolithographic product 10 in which the content of the component (e) in the composition for a model material exceeded 3.0 parts by mass, the bleeding occurred.

INDUSTRIAL APPLICABILITY

With the present invention, it is possible to provide a composition for a support material with which a support material having both excellent water removal properties and excellent supportability is realized and that has excellent low-temperature stability. The present invention can be widely applicable to ink for a support material to be used in inkjet stereolithography.

The invention claimed is:

1. A composition for a support material to be used in a support material for supporting a model material used to form a shaped article through ink-jet stereolithography, the composition comprising:
   polyalkylene glycol having an oxybutylene group,
   wherein a content of the polyalkylene glycol having an oxybutylene group is 15 parts by mass or more and 75 parts by mass or less with respect to a total mass of the composition for a support material taken as 100 parts by mass.

2. The composition for a support material according to claim 1, comprising:
   the polyalkylene glycol having an oxybutylene group;
   a water-soluble monofunctional ethylenic unsaturated monomer; and
   a photopolymerization initiator.

3. The composition for a support material according to claim 2,
   wherein a content of the water-soluble monofunctional ethylenic unsaturated monomer is 19 parts by mass or more and 80 parts by mass or less, and a content of the photopolymerization initiator is 2 parts by mass or more and 20 parts by mass or less, with respect to the total mass of the composition for a support material taken as 100 parts by mass.

4. The composition for a support material according to claim 2, further comprising:
   a surface controlling agent,
   wherein a content of the surface controlling agent is 0.005 parts by mass or more and 3.0 parts by mass or less with respect to the total mass of the composition for a support material taken as 100 parts by mass.

5. The composition for a support material according to claim 2, further comprising a water-soluble organic solvent,
   wherein a content of the water-soluble organic solvent is 30 parts by mass or less with respect to the total mass of the composition for a support material taken as 100 parts by mass.

6. The composition for a support material according to claim 2, further comprising a storage stabilizer.

7. An ink set for stereolithography comprising the composition for a support material according to claim 1, and a composition for a model material.

8. The ink set for stereolithography according to claim 7, wherein the composition for a model material includes:
   a monofunctional ethylenic unsaturated monomer;
   a polyfunctional ethylenic unsaturated monomer having two or more functional groups;
   an oligomer;
   a photopolymerization initiator, and
   a surface controlling agent.

9. The ink set for stereolithography according to claim 7, wherein a content of the monofunctional ethylenic unsaturated monomer is 19 to 49 parts by mass, a content of the polyfunctional ethylenic unsaturated monomer having two or more functional groups is 15 to 50 parts by mass, a content of the oligomer is 10 to 45 parts by mass, a content of the photopolymerization initiator is 3 to 15 parts by mass, and a content of the surface controlling agent is 0.005 to 3.0 parts by mass, with respect to the total mass of the composition for a model material taken as 100 parts by mass.

* * * * *